United States Patent [19]
Lentini

[11] Patent Number: 6,151,933
[45] Date of Patent: Nov. 28, 2000

[54] LOCKING BOX

[75] Inventor: Robert Lentini, Pensacola, Fla.

[73] Assignee: Daws Mfg. Co., Inc., Pensacola, Fla.

[21] Appl. No.: 09/123,515

[22] Filed: Jul. 28, 1998

[51] Int. Cl.[7] ................................................. B65D 55/14
[52] U.S. Cl. ................................... 70/159; 70/63; 70/162
[58] Field of Search ........................ 70/63, 54, 159–162, 70/166–169, 171–173

[56] References Cited

U.S. PATENT DOCUMENTS

| | | | |
|---|---|---|---|
| 565,459 | 8/1896 | Hoile | 70/166 X |
| 1,407,755 | 2/1922 | Kennedy | 70/161 |
| 1,510,632 | 10/1924 | Nutry | 70/63 |
| 3,204,436 | 9/1965 | Nemsky | 70/168 X |
| 3,952,560 | 4/1976 | Lee | 70/54 X |
| 4,370,873 | 2/1983 | Edmunds | 70/167 X |
| 4,683,734 | 8/1987 | Peterson | 70/171 X |
| 5,189,894 | 3/1993 | Buck | 70/63 |
| 5,226,302 | 7/1993 | Anderson | 70/159 |
| 5,235,830 | 8/1993 | Benge | 70/159 X |
| 5,484,092 | 1/1996 | Cheney | 70/63 X |
| 5,588,315 | 12/1996 | Holmgren | 70/63 X |
| 5,760,689 | 6/1998 | Holmgren | 70/63 X |
| 5,823,411 | 10/1998 | Gronwoldt et al. | 70/159 X |
| 5,860,302 | 1/1999 | James | 70/63 |
| 5,875,948 | 3/1999 | Sadler | 70/162 X |

FOREIGN PATENT DOCUMENTS

| | | | |
|---|---|---|---|
| 392899 | 10/1990 | European Pat. Off. | 70/63 |
| 2816488 | 10/1979 | Germany | 70/63 |

*Primary Examiner*—Suzanne Dino Barrett
*Attorney, Agent, or Firm*—Finnegan, Henderson, Farabow, Garrett & Dunner, L.L.P.

[57] ABSTRACT

A locking box for use in the cargo bed of vehicles, having a body and a lid. The lid has locking means that can be released from either side of the box, and are completely contained within the lid. A bumper is mounted on the lid to protect the box from collisions with items in the cargo bed. The body of the box is preferably contained within the cargo bed, and the lid is designed to complement the shape of the vehicle.

34 Claims, 7 Drawing Sheets

LOCKING BOX

BACKGROUND OF THE INVENTION

1. Field of the Invention

The present invention relates to an improved locking box, and more particularly to an improved locking box for use in the cargo bed of a vehicle.

2. Description of Related Art

Locking boxes have been used for a long time as accessories for trucks, boats, or even in stationary applications to contain and protect from the elements and from possible theft a variety of articles. Perhaps best known are tool boxes used either on their own, or mounted on small trucks and pickup trucks, that are used by workers to carry their tools and equipment wherever their skills are needed. Some of the key features of these boxes are their toughness and resistance to abuse, so that they will survive and last in demanding environments, and their ability to protect their contents from the elements, so that possibly delicate equipment and instruments will not be exposed to rain, humidity, or other hazards which may damage them. Further, these boxes should protect the contents from theft, or at the very least provide enough protection to slow down access to the contents by would-be thieves and make the box an unattractive target.

These boxes can also be used as an item of convenience by persons who do not depend for their livelihood on carrying their equipment to remote places. In fact, a variety of people make extensive use of locking boxes to carry all sorts of supplies and merchandise. In many cases, locking boxes have become standard accessories for trucks, vans, boats, and other vehicles.

While various types of boxes are used for mounting on pickup trucks and other vehicles, the inventor believes that these boxes conventionally in use have various limitations. For example, most of these boxes extend substantially above the plane of the cargo bed of the vehicle and thus do not fit in visually with the overall look of the vehicle. Typically these boxes are made of plastic or of metal. Conventional boxes can not easily be colored or painted to match the coloring of the vehicle upon which they are mounted. This makes it more difficult to coordinate the box with the rest of the vehicle. Most of these boxes also have locks that are typically placed outside the body of the box itself. In other instances the locking mechanism intrudes in the main storage area of the box. This tends to reduce the available storage volume and also makes it easier to snag the contents of the box on the lock when they are put in or out of the box. While some of these boxes have locking mechanisms on the opposite ends of the box, each mechanism typically can be opened or locked from only one side of the vehicle. Such boxes thus require the operator to move first to one side and then to the opposite side of the vehicle, in order to lock or unlock the box. Other locking boxes of current design have two or more openings that cannot all be opened from only one side of the vehicle.

Conventional locking boxes therefore fail in many cases to meet all the requirements for a modern, well designed locking box. There is therefore a need for an improved locking box which can be used on vehicles such as pickup trucks, small trucks, or boats, or which can be used separately from such vehicles.

SUMMARY OF THE INVENTION

One object of the invention is to provide an improved tool box that overcomes the deficiencies of the prior art. Another object is to provide a locking tool box with an improved locking mechanism.

The locking box according to the present invention was developed to provide storage for various items and to protect them from the elements and from theft. In a preferred embodiment, the locking box provides for easy operation since the lid can be locked or unlocked by an operator standing on one side of the vehicle, without having to walk around the vehicle to the other end of the box. The box also preferably includes at least two separate locks for security. The locks preferably include a latching device to secure the lid to the body of the box, and a locking device to prevent release of the latching device. The mechanisms of the locking and latching devices preferably are located within the lid of the box and therefore do not protrude within the main volume of the box when the lid is open, thus making it easier to remove or insert items in the box. This arrangement also hides from sight most of the locking and latching mechanism, thus discouraging possible theft. The locking box is also preferably designed to blend in with the cargo bed of a vehicle and complement the lines of the vehicle without appearing to be an afterthought to the design of the vehicle. The box or portions of the box can also be formed of color coordinating components, or painted in any desired color, to match the color configuration of the vehicle.

The preferred box of the invention is also designed for easy assembly, requiring a minimum amount of welding. In addition, many of the components of the locking box are of standardized design, so that components of different materials or surface textures can be utilized interchangeably.

The locking mechanism of the invention is preferably contained completely within the lid and consists of at least two latching devices which are interconnected, so that unlatching one of the latching devices will also unlatch the other one. This feature is especially useful when the box is mounted in the cargo bed of a pickup truck or other such vehicle, so that the operator can open the lid while standing on one side of the vehicle bed, without having to unlatch one device on one side and then go over to the opposite side to unlatch the second device. The latching devices can also be locked with locking devices, also contained within the lid of the box. Each locking device, when locked, prevents operation of the respective latching device, so that the box cannot be opened when the locking devices are in the locked position. Both the locking and the latching devices are preferably placed mostly within an overhang portion of the lid, extending beyond the main body of the box. The latching devices are preferentially hidden by the structure of the lid so that they are out of sight from a casual observer and protected from forced openings.

The box itself can be is designed to fit within the cargo bed of a truck or other vehicle. It preferably includes side extensions that fit on top of the vertical side walls of the cargo bed, designed to secure the box to the cargo bed. In this way, most of the bulk of the box is not visible from outside of the vehicle, as only the side extension of the box and the lid protrude above the bed of the vehicle. This improves the overall appearance of the box and vehicle combination, in particular if all or portions of the box are painted the same color, or a complimentary color of the vehicle.

The lid of the box also preferably incorporates a rubber bumper placed on the edge of the lid where the locks are mounted, normally facing towards the open area of the cargo bed, where items are loaded. This bumper is mounted on a structural member of the box lid and serves to prevent damage to the box, in case items in the cargo bed slide and collide with the box during movement of the vehicle.

One aspect of the invention is thus a locking box for use in a cargo bed of a vehicle, which includes a body defining a bottom surface, two side surfaces, a front surface and a rear surface of an enclosable volume, fitting substantially within the cargo bed. Side extensions of the body extend from two opposite side surfaces and are used to join the body to vertical surfaces of the cargo bed. A lid is hingedly attached to a top portion of one side surface and overhangs the body opposite to the hinged attachment. Two locking means are disposed on a front portion of the lid for securing the lid to the body, the locking means being interconnected to be operable by actuating one locking means. The locking box can also comprise a resilient bumper that is disposed adjacent the front end of the lid. Right and left end caps forming side ends of the lid can also be used to complete the lid.

In another embodiment of the invention, the invention is a locking system to secure a pivotable lid to a body of a box. The locking system preferably includes at least two locking assemblies spaced along one edge of the lid. Each locking assembly includes a lock plate mounted adjacent to the edge of the lid and a latch plate pivotally mounted to the lock plate and movable between a closed and an open position so that in the closed position the latch plate engages a protrusion, such as a lock bar, extending from the body. Each locking assembly further includes a trip bracket pivotally mounted on the lock plate to selectively prevent movement of the latch plate. The trip bracket has a first position to prevent movement of the latch plate from the closed position and a second position to allow movement of the latch plate. Each locking assembly also has a handle pivotally mounted on the front portion of the lid and operatively connected to the trip bracket. When a user operates the handle to unlatch the lid, the trip bracket is urged to the second position, and the latch plate opens. Each assembly also includes a locking device to prevent movement of the handle when the locking device is in a locked position. The locking system can also include springs to urge the latch plate to the open position and the trip bracket to the first position. A link bar can be used to synchronize the movement of the trip bracket of each of the several locking assemblies disposed on the box lid.

In yet another embodiment, the invention is a lid for a locking box, having front, rear, and two side frame members configured to hold a top panel. Molded side elements are attached to the frame members to give a smooth finish to the lid. The lid also has a bumper attached to the front frame member to protect the lid from collisions.

It is to be understood that both the foregoing general description and the following detailed description of the invention are exemplary and explanatory, and are intended to provide further explanation of the invention as claimed.

BRIEF DESCRIPTION OF THE DRAWINGS

The accompanying drawings are included to provide further understanding of the invention and are incorporated in and are considered part of the specification, illustrate one embodiment of the invention, and together with the description serve to explain the principles of the invention.

In the Drawings.

DESCRIPTION OF THE PREFERRED EMBODIMENTS

Reference will now be made in detail to the present preferred embodiments of the invention, examples of which are described in the accompanying specification and illustrated in the accompanying drawings. While the present invention can be broadly applied to the field of locking boxes, it is especially well suited for use as a locking box fitting in the cargo bed of a vehicle.

Figure 1:
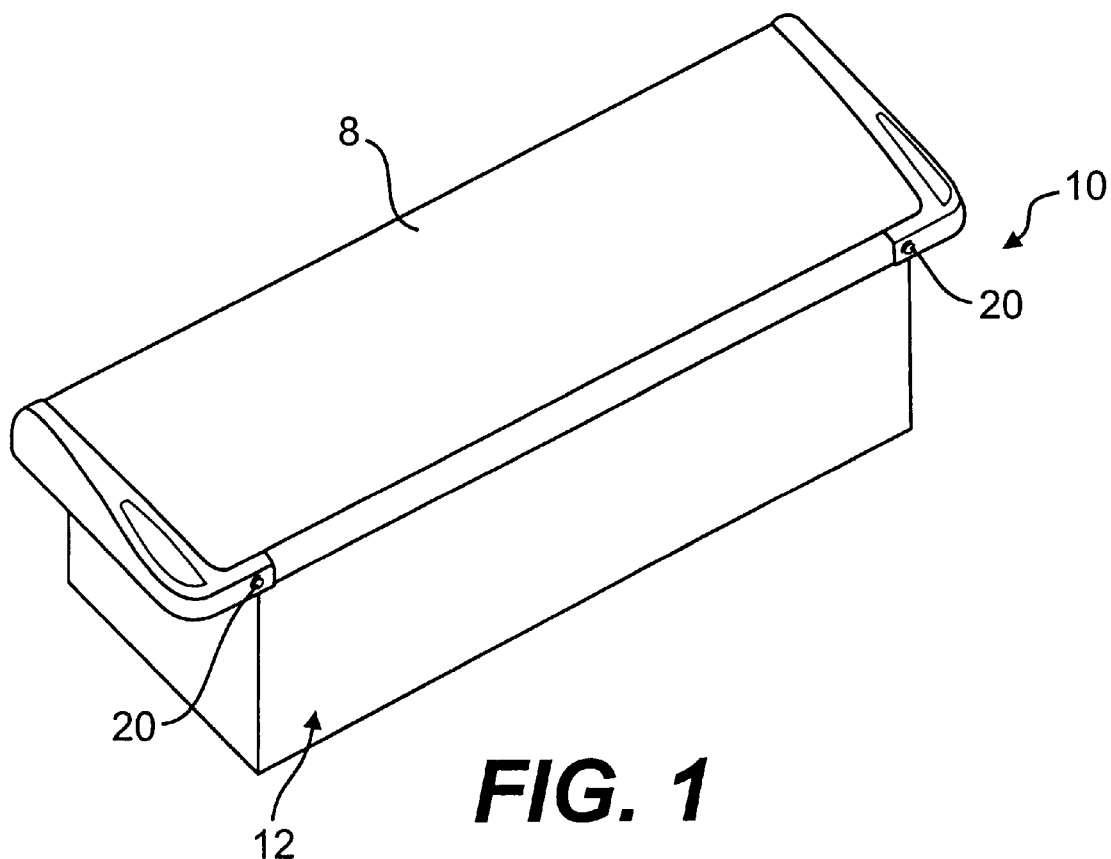
FIG. 1 is a perspective view showing one embodiment of the locking box according to the invention.
Figure 2:
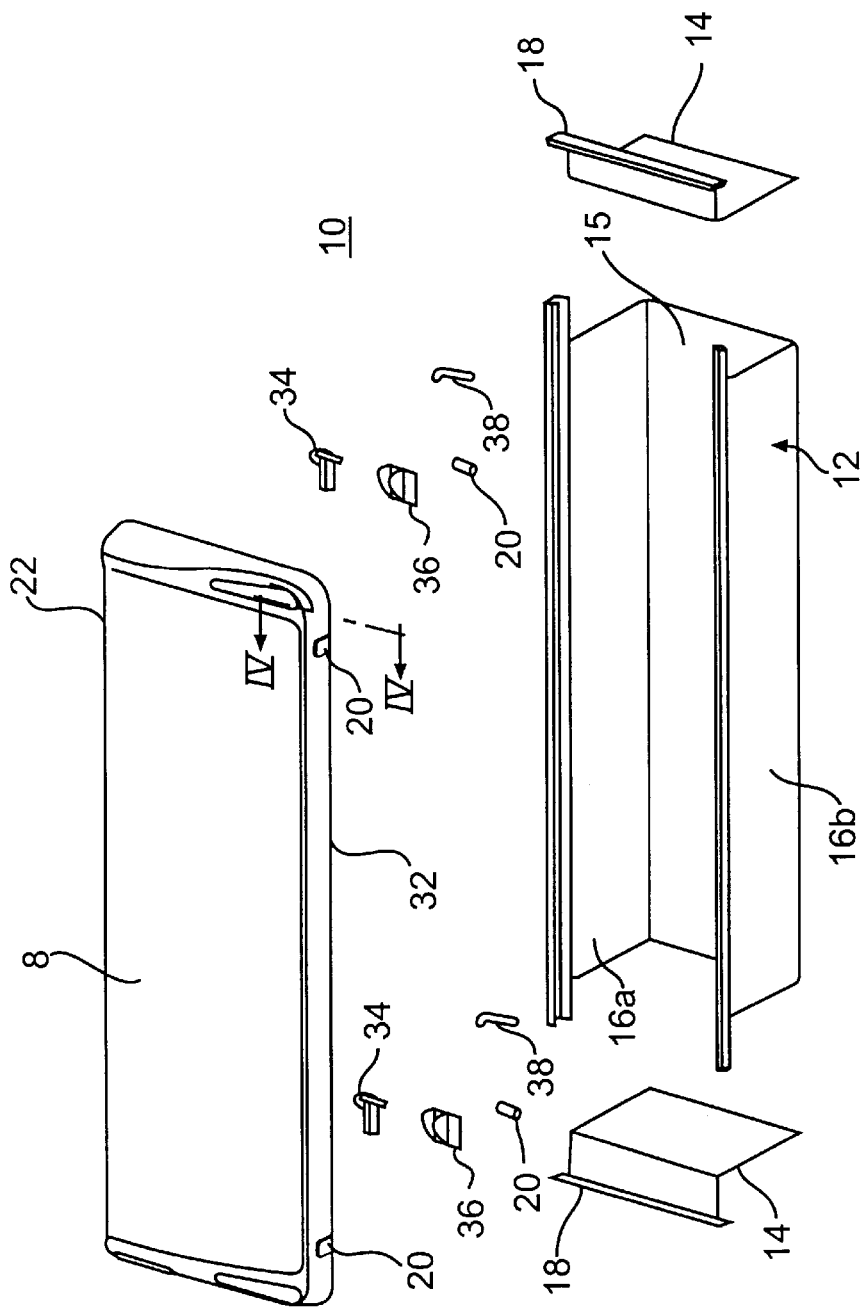
FIG. 2 is an exploded perspective view showing the locking box of FIG. 1.

With reference to FIGS. 1 and 2, a locking box 10 is shown. In this embodiment according to the invention, the box is optimized to fit in the cargo bed of a pickup truck. Box 10 is formed by a main body 12 and by a lid 8 attached to body 12 by a conventional hinge 22. Body 12 has a bottom surface and four essentially vertical side surfaces defining a volume in which articles are held in the box. Specifically, the body is formed by a bottom surface 15, front and rear surfaces 16, and end surfaces 14. The exact geometry of the box can vary from what is described in the drawing, without effecting the functionality of the invention. Similarly, the box can be designed to include a plurality of separate internal compartments or accept tool trays.

The locking box of the present invention can be secured to a truck, vehicle, or other structure in a variety of ways known to those skilled in the art. In a preferred embodiment, the locking box includes side extensions 18 that extend from a top portion of end surfaces 14, are substantially parallel to a bottom surface 15, and are designed to fit on top of vertical sides of a vehicle cargo bed. Conventional methods and devices are used to attach these extensions to the cargo bed of the vehicle, for example by the use of bolts, screws, or other fastening devices. According to this embodiment, substantially all of the body 12 of the box fits inside the cargo bed of the vehicle, below the top of side surfaces of the cargo bed. This embodiment is therefore aesthetically pleasing and aerodynamically efficient. The design also makes the box less visible to an observer.

Referring to FIG. 2, a lid 8 of the box 10 is also shown. Lid 8 is hingedly attached to a rear side surface 16a of body 12 and can be rotated to an open and a closed position. In a preferred embodiment, the front portion of lid 8, opposite to the hinge 22 location, overhangs beyond a front surface 16b of body 12. As will be described in detail later, this overhang provides several benefits. For example, all or portions of the locking mechanism for the box can be incorporated into the overhang. In one embodiment, the design of the lid allows a user to easily reach actuating handles of the latching device. In this embodiment, at least the activating handles are incorporated into the portion of the lid that overhangs the box, so that the box can be easily opened, after the locking devices that prevent rotation of the activating handles are unlocked.

Figure 3:
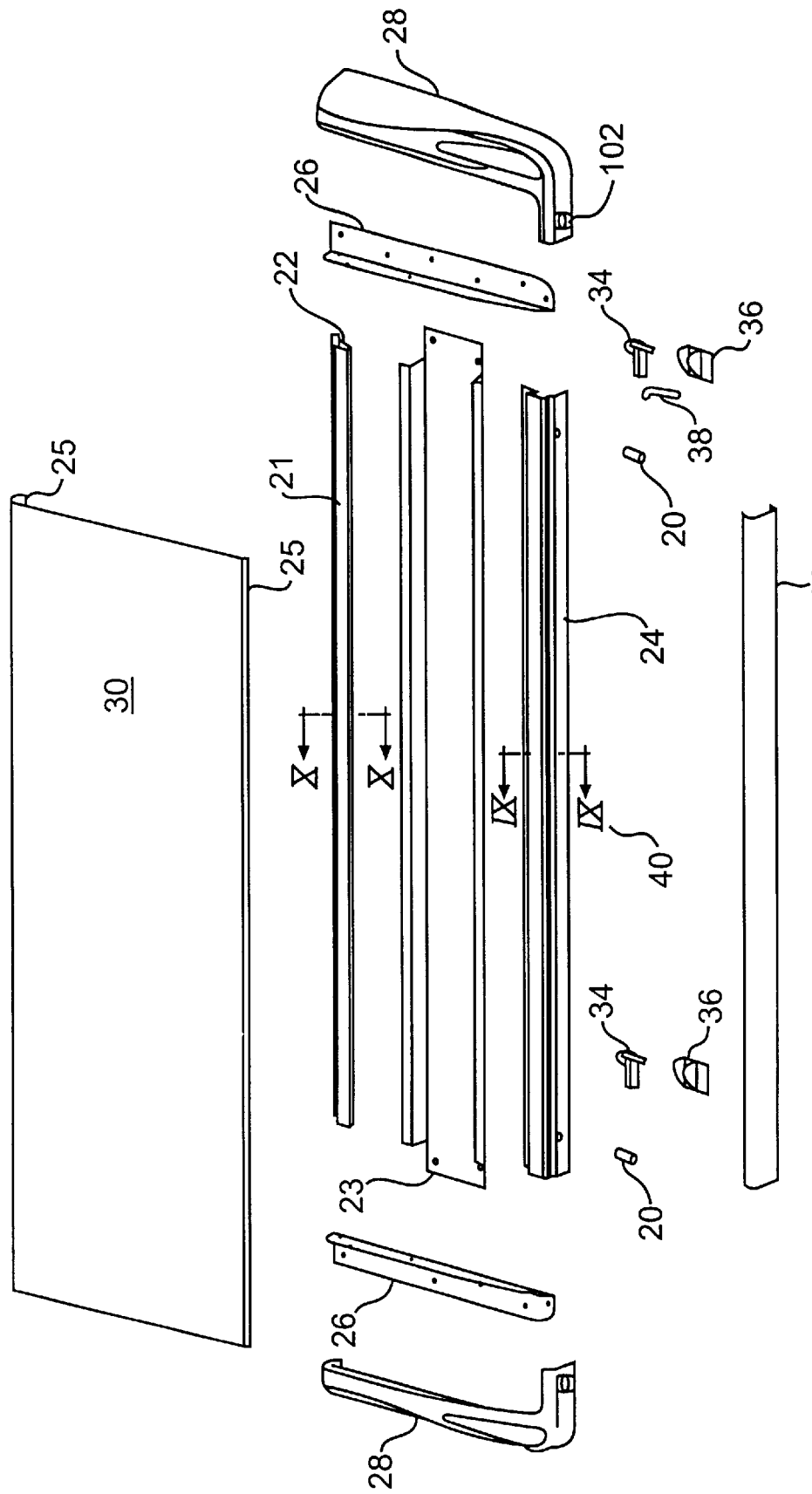
FIG. 3 is an exploded perspective view of the lid of the locking box shown in FIG. 1.

The detailed construction of one embodiment of the lid is described by referring to FIG. 3. The structural integrity of this lid is assured by four structural members, preferably formed by metal extrusions. These structural members include a front frame member 24, a rear frame member 21, and two side end plates 26, connected together and forming a structure of approximately rectangular shape. Other shapes can be used, as long as they conform to the shape of the box body 12. The structural frame preferably also includes a central brace 23 that is connected to at least the side end plate 26. A hinge 22 is located on the rear frame member 21 and connects the lid to the body 12 in a rotatable manner. The center brace 23 gives additional strength to the lid.

The lid is completed by several additional components. As shown, the lid includes a top panel 30 disposed over the structural members. The top panel can be made of metal, plastic, or any other material suitable to enclose the box. Side elements 28 are located on the two side edges of the lid and fit over end plates 26. These side elements are designed to cover sharp edges of the structural members and to give to the lid an aerodynamic, visually appealing shape, designed to blend in with the shape of the vehicle upon which the box is mounted. These side elements are preferably molded of plastic material and can include grip surfaces to facilitate opening of the lid. These side elements are fixedly secured to the frame when the lid is complete.

In the embodiment shown in FIG. 3, the top panel at its front and back edges includes flanges 25 or protrusions that fit into corresponding slots 50, formed in the front and rear frame members 24 and 21. These flanges 25 and corresponding slots 25 are preferably designed such that the top panel is locked into place on the front and rear frame members after installation. The top panel is installed by placing the flanges 25 into the corresponding slots at one end of the front and rear frame members 24 and 21, and then sliding the top panel so that the top panel engages the frame members along their entire length. The side elements 28 are formed to fit over the ends of the top panel 30 and lock the top panel in place, when the side elements 28 are fixed to the end plates 26. For example, the side elements 28 can be fixed to the end plates 28 by screws. This particular lid design allows a user to use top panels of different materials, colors, or designs, as desired. In addition, the molded side elements can be formed of different materials or colors, or can be painted as desired.

In a preferred embodiment, a bumper mounted on the front frame member is incorporated in the overhang portion of the lid, thereby protecting the remaining portions of the box from damage by large and shifting loads in a cargo bed. In the preferred embodiment, a rubber bumper 32 is mounted adjacent to front frame member 24, on the side facing the part of the cargo bed where additional loads would be carried. Bumper 32 can be made of a hollow elastomeric material, or any other elastic material which would prevent damage to the lid structure if items carried in the cargo bed slide and collide with the box. Since the portion of the lid including front structural extrusion 24 and bumper 32 preferably overhangs beyond front side 16 of the box, bumper 32 also protects to a great extent body 12 of the box from collisions with objects carried in the cargo bed.

Although the bumper of the present invention can be attached to the overhang of the lid by a variety of different ways, in a preferred embodiment the bumper and the front frame member 24 are designed so that the bumper can be slid within a slot formed in the front face of the front frame member 24. Such a slot is shown as slot 50 in FIG. 9. The bumper can easily be replaced by removing one of the side elements 28 and sliding the bumper out of the slot in front frame member 24. This ability to easily remove the bumper 32 makes it simple to color-coordinate the components of the box or to replace a damaged bumper.

Figure 6:
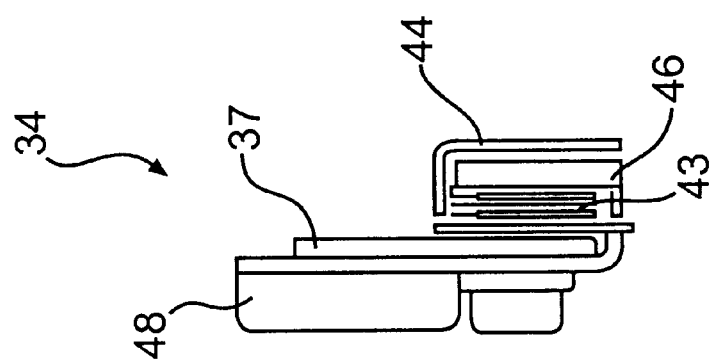
FIG. 6 is a front view of the latching device shown in FIG. 5.

One preferred embodiment of the locking mechanism used to secure the lid 8 on the body 12 of the box will be described by referring to FIGS. 3 and 4. Two latching devices 34, further illustrated in FIGS. 5 & 6, are attached to front frame member 24. At least a portion of the locking mechanism is ultimately held within a space defined by the front frame member 24. Preferably, all components of the locking mechanism, except the corresponding locking component on the box body 12 itself, are fixed to the front frame member 24. In addition, one latch 34 is preferably positioned near each opposite end of the front frame member 24. In this configuration, at least one of the latching devices 34 can be reached by an operator standing outside of the vehicle, near one end of the box 10.

Figure 9:
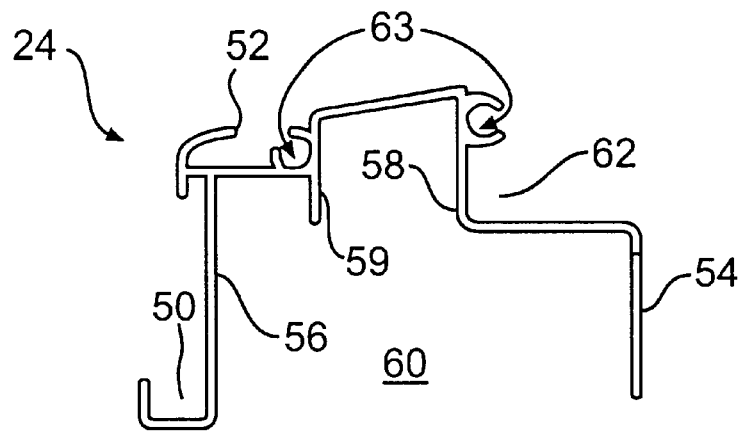
FIG. 9 is a cross sectional view along line IX—IX of the front frame member shown in FIG. 3.

In the preferred embodiment, front frame member 24 has a substantially channel like cross-section 60 as shown in FIG. 9, forming a three-sided enclosure with an open side facing downward. Referring to FIGS. 2 & 3, actuating handles 36 are preferably mounted within the channel 60 on opposite ends of the front frame member 24 and are thereby hidden from view by the structure. The latching devices 34 are preferably fixed to a rear surface 54 on opposite ends of the front frame member 24, so that they are not accessible when the lid 8 is closed and locked in place. As will be explained in more detail below, each actuating handle 36 is operably connected to a respective latching device 34 on the back of the front frame 24, so that the rotation of the actuating handle 36 will cause the latching device 34 to disengage the locking component on the box body 12. Preferably, as seen in FIG. 4, the latching devices 34 on both sides of the box are interconnected, so that rotation, or other similar operation of one actuating handle 36 will cause both latching devices 34 to disengage the corresponding locking component on the box body. In the preferred embodiment, the box 10 includes a key lock or similar locking device that is incorporated into the front frame member 24 and prevents the rotation or operation of the actuating handle 36, when the locking device 34 is in the lock position. This design of the mechanisms of the locking component, actuating handle 36, and latching device 34 makes it difficult for a potential thief from interfering with the locking mechanism from the outside when the lid 8 of the box 10 is closed.

As shown in FIGS. 4 and 7–9, the preferred embodiment includes actuating handles 36 connected to latching devices 34 by a pivot arm 38. Pivot arm 38 extends into the channel 60 of front frame member 24 through an opening 62 on face 58 of the frame member. Handles 36 are located within the channel 60 of the front frame member 24. One end of each handle 36 is pivotally mounted on pivot arm 38, so that the other end of each handle can be pivoted upwards, further into the frame member channel 60. As a result, the handles can be operated by an operator standing near the box by reaching underneath the overhang of the lid 8, into the opening of the channel 60 of the front frame member 24, and pushing up on one of the handles 36 to pivot pivot arm 38.

Figure 4:
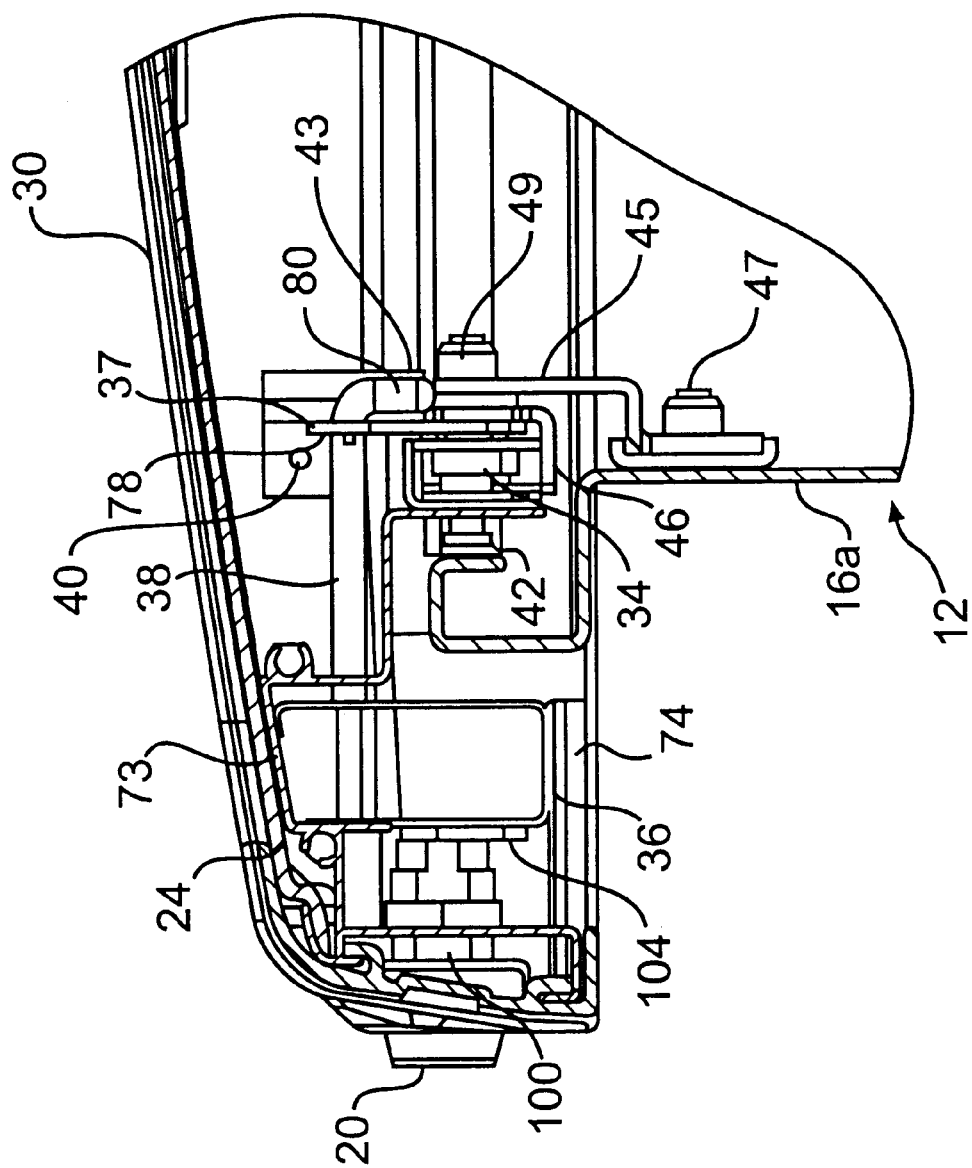
FIG. 4 is a partial cross-sectional view taken generally along line IV—IV of the lid shown in FIG. 2 but also showing portions of the box to which the lid is ultimately attached.
Figure 5:
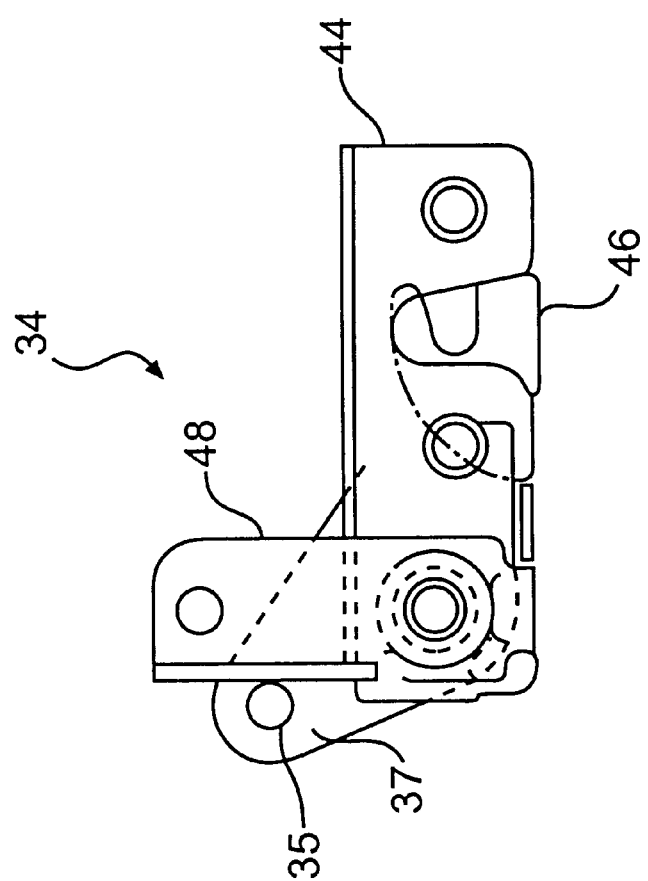
FIG. 5 is a side elevation view of a latching device according to one embodiment of the invention.
Figure 8:
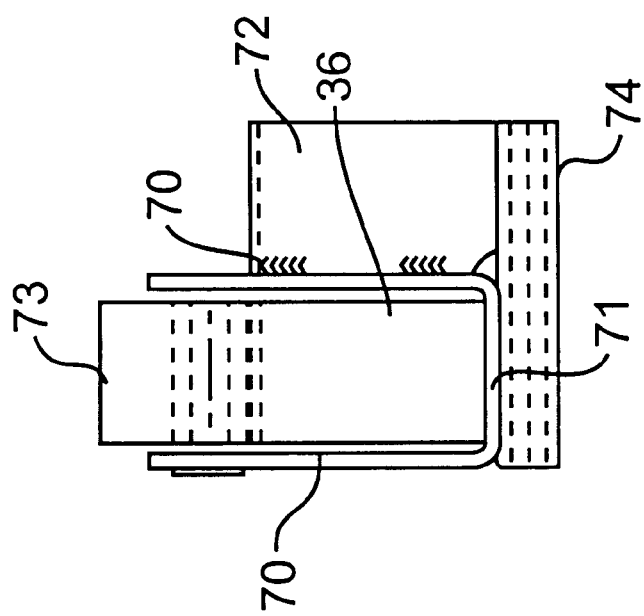
FIG. 8 is a front view of the actuating handle of FIG. 7.
Figure 7:
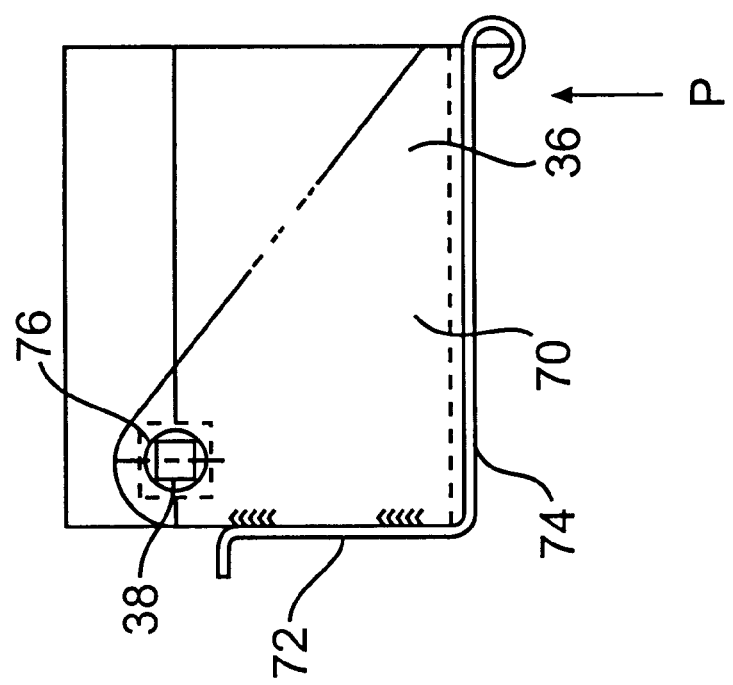
FIG. 7 is a side elevation view of a actuating handle for the latching device of FIGS. 5 and 6, according to an embodiment of the invention.

As shown in FIG. 4, actuating handles 36 are enclosed on three sides by the channel 60 (see FIG. 9) of front frame member 24, so that they are protected from accidental opening, and are to a certain extent hidden from view, to dissuade possible theft. FIGS. 7 and 8 illustrate a preferred embodiment of the actuating handle 36 according to the present invention. As shown, this actuating handle is formed of metal, although it also could be formed of a variety of different materials, such as molded plastic. The handle has two opposing side walls 70, that are preferably triangular in shape and connected to each other via connecting portion 71, to provide strength. The handle also includes an end wall 72 and a bottom wall 74, which is the operating surface a user engages to rotate the handle 36. As shown in FIG. 4, the end and bottom walls 72. 74 preferably have a width that is slightly smaller than the width of the enclosure of the front frame into which the handle 36 fits. In a particularly preferred embodiment, the top portion 73 of the handle 36 formed by side walls 70 has a smaller width designed to fit within a smaller enclosure 61 of the front frame member 24 (see FIG. 9). This hidden actuation design makes it particularly difficult for a thief to break into the box. The side walls 70 include sleeves 76, preferably rectangular, to accept the end of pivot arm 38 and transmit rotation of the handle 36 to pivot arm 38. The rotation of pivot arm 38, in turn, releases latching devices 34 from a rod 42 on the body 12 of the box.

In operation, pushing up on handle 36, at the point indicated by the arrow P in FIG. 7, rotates the handle 36, which is fixed to and therefore rotates pivot arm 38. Pivot arm 38 is fixed to the handle 36 at one end and preferably extends through an opening in the front frame member 24 toward the other end, where the pivot arm 38 is supported and fits in an opening 35 formed in a bracket 37 of latching device 34. In a preferred embodiment, cotter pin 78 (FIG. 4) prevents removal of pivot arm 38 from front frame member 24 by abutting against bracket 37. The pivot arm has a downturned portion 80 that, upon rotation of pivot arm 38, in turn operates latching device 34 so that it can be released from the rod 42. Preferably, the actuating handles 36 are made of metal, such as sheet metal, and the pivot arms 38 are also of metal, such as wrought steel. In a more preferred embodiment, the handles 36 and the pivot arms 38 are made of die cast zinc, to maintain the strength and reduce the weight of the assembly.

A linkage mechanism, such as link bar 40 is provided between the latching devices 34 that are mounted on the opposite sides of the lid frame, so that releasing one of the latching devices 34 will also release the other one, and the lid 8 can be opened without having to operate both of the actuating handles 36. Latching devices 34 and all of the other components of the locking mechanism are secured to front frame member 24, and are completely contained within the lid structure of the box. Only a protrusion such as the rod 42, is disposed on the body 12 of the box and is engaged by latching devices 34 to secure the lid to the body.

According to the invention, a variety of different latching devices can be used to latch the lid to the body of the box, when the lid is closed. In the embodiment disclosed, the latching device on each side of the box includes a latch plate on the back of the front frame member that engages a corresponding member formed on the body of the box. In the specific embodiments disclosed, the corresponding member is a protrusion formed on the box body, and the latching device includes a movable latch plate that can engage the protrusion, thereby locking the lid to the box body. In the embodiment shown in FIG. 4, the protrusion is a horizontally extending rod that is fixed to a bracket 45, that in turn is fixed to the box body 12. In the embodiment shown, bracket 45 at one end is secured to body 12 by a bolt 47 welded to the box and at the other end has a hole that accepts a bolt 49 that serves as the protrusion. The holes at both ends of the bracket 45 are preferably in the form of slots, permitting vertical and horizontal adjustment of the bracket 45 to allow proper alignment of the locking mechanism.

Locking devices, such as key locks 20, are also attached to front frame member 24, adjacent to each latch handle 36. In a preferred embodiment, the key lock 20 at one end includes a locking cam 104 opposite the bottom wall 74 of the handle 36. In the locked position, the locking cam 104 of lock 20 prevents movement of handle 36, thus preventing unlatching of latching device 34 from rod 42. Each lock 20 operates only on its corresponding handle 36.

When the two opposing latching devices 34 are linked together and only one of the locking devices 20 is locked to prevent movement of its corresponding handle 36, the box can still be opened by activating the other handle 36, whose locking device is in the unlocked position. This feature allows a user to open the box by unlocking one of the locking devices 20 from one side of the vehicle, and lifting the handle on that same side. The box can then be re-locked by closing the lid 8 and locking again that same locking device 20. There is never a need for the user to move to the opposite side of the vehicle for either unlocking or re-locking the box.

FIGS. 5 and 6 show in greater detail the mechanism of one embodiment of a latching device 34 of the present invention. Latching device 34 comprises a lock plate 44 which is secured to the front frame member 24, and a latch plate 46 pivotally mounted on lock plate 44 for engaging and disengaging a rod or protrusion 42 extending from the front surface 16 of box body 12. In the preferred embodiment the protrusion 42 is in the form of a rod that extends from adjustable bracket 45. Adjustable bracket 45 can be adjusted to correctly position rod 42 both vertically and horizontally on body 12. Latch plate 46 has a resilient member, such as a spring 43, urging it to the open, or unlatched, position. However, when latch plate 46 is placed in the latched position by engaging the protrusion 42 in its recess 39, trip bracket 48 prevents the latch plate 46 from moving to the unlatched position.

Trip bracket 48 is urged by a spring (not shown) into a first position, whereby it prevents latch plate 46 from moving to the unlatched position. Trip bracket 48 can be moved by rotation of pivot arm 38 against the tension of its spring (not shown) into a second position that will allow spring 43 to bias latch plate 46 to move to the unlatched position. Pivot arm 38 is connected to actuating handle 36 and is disposed adjacent trip bracket 48. When handle 36 is actuated by an operator, pivot arm 38 urges the trip bracket 48 into the second position, thus allowing spring 43 to bias latch plate 46 to unlatch from rod 42 and thereby release the lid 8 from the body of the box.

The cross section of front frame member 24 is described referring to FIG. 9. A front portion of the frame member forms a slot 50 into which bumper 32 slides. Slot 50 is designed to let bumper 50 slide along the length of front frame member 24, but to otherwise retain it in place. A slot 52 is provided on the top surface of front frame member 24, to hold in place the front edge of top panel 30. The rear portion of front frame member 24 forms a mounting surface 54. Latching devices 34 are mounted along mounting surface 54, in a position that is inaccessible from the outside when the lid is closed. Hand operable handles 36 have opposing side walls 70 fitting in an enclosure formed by inner surfaces 58 and 59 of the front frame member 24 (FIGS. 7,8). The entire width of handles 36 fits within channel 60 defined by surfaces 56 and 54. The two end plates 26 are attached to front frame member 24 by fasteners threaded in fittings 63, thus forming part of the load bearing structure of the lid.

Figure 10:
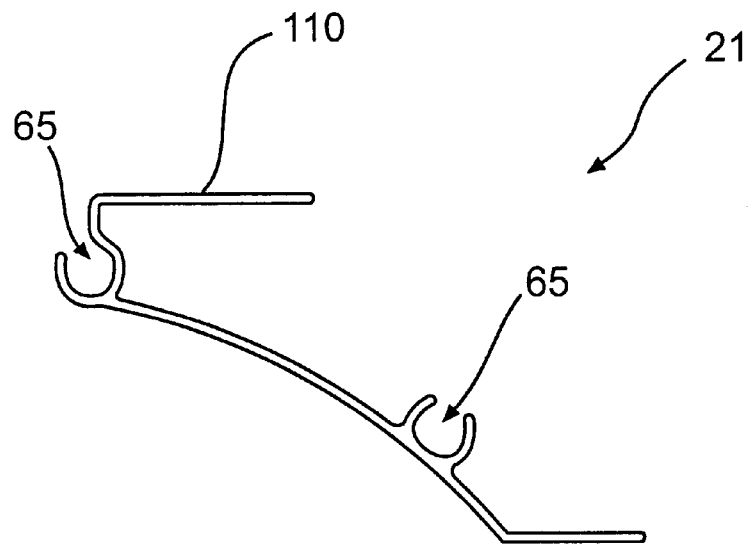
FIG. 10 is a cross sectional view along line X—X of the rear frame member shown in FIG. 3.

FIG. 10 shows a cross section of the rear frame member 21. Similarly to the front frame member 24, the rear frame member 21 is preferably made as a metal extrusion. Threaded fittings 65 are provided to facilitate assembly with end plates 26. A lip 110 is provided, to retain in place rear flange 25 of the top panel 30.

The entire lid structure 8 of the box therefore has a neat and uncluttered appearance, which results in an improved blending of the box structure with the vehicle upon which the box is mounted. Additional advantages are that the locking and latching devices are protected from unauthorized opening, and are protected from the elements. Since essentially the entire locking and latching device is contained within the lid, the opening of the box is uncluttered when the lid is opened, thus facilitating introduction or removal of items in the box. All the goals of this improved box are thus met according to the present invention, thus producing a more practical and visually appealing product.

The assembly procedure of the lid for a preferred embodiment will be explained with reference to FIGS. 3–6. Front and rear frame members 24, 21 are fastened to end plates 26. Central brace 23 is then fastened to frame members 24. 21 to form the basic structure of the lid. Latching devices 34, handles 36, locks 20, and link member 40 are then mounted on front frame member 24 by using the following procedure. The key cylinder 100 of lock 20 is installed by inserting it through hole 102 of side element 28, and through a corresponding aligned hole in front frame member 24. A lock washer and nut combination may be used to secure the key cylinder 100 in place. Locking cam 104 is then installed at the end of the key cylinder 100. Latch 34 is bolted in position on front frame member 24. The actuator handle 36 is positioned within channel 60 of the front frame member 24, and is held in place by pivot arm 38 as it is pushed through aligned holes in bracket 37 (hole 35), in front frame member 24, and through sleeve 76 of handle 36. Cotter pin 78 is installed to prevent removal of pivot arm 38. The same procedure is followed for the second lock, and the two trip brackets 48 are connected by link member 40, so that releasing one of the latching devices 34 also releases the other.

Once the locks 20 and latches 34 are assembled, bumper 32 is slid in place along slot 50 in front frame member 24, and top panel 30 is similarly slid in place. Finally, side elements 28 are fastened to the frame, thus securing in place bumper 32 and top panel 30. No welding is required to assemble the lid due to its modular construction. The bumper, top panel and side elements can easily be replaced, to achieve the desired color- coordination of the box.

It will be apparent to those skilled in the art that there are modifications and variations that can be made in the structure of the present invention, without departing from the spirit or scope of the invention. Thus, it is intended that the present invention covers the modifications and variations of this invention provided they come within the scope of the appended claims and their equivalents.

What is claimed is:

1. A locking box comprising:
    a body defining an enclosable volume, said body including front, rear, and side surfaces;
    a lid having a front portion and a rear portion, the rear portion being pivotally mounted to the body; and
    at least one locking mechanism disposed adjacent the front portion of the lid for securing the front portion of the lid to the body, each locking mechanism comprising:
        an actuating handle;
        a pivot arm non-rotatably connected to the actuating handle; and
        a latching device operatively connected to the pivot arm and adapted to securely and releasibly engage a member on the front surface of the body to securely and releasibly latch the front portion of the lid to the body,
    wherein the actuating handle is positioned entirely within the lid and is hidden from view when viewing the locking box from the top or from the front.

2. The locking box of claim 1, wherein the member includes a protrusion and latching device has a recess to accommodate the protrusion.

3. The locking box of claim 1, including two latching mechanisms.

4. The locking box of claim 1, wherein the front portion of the lid overhangs the body beyond the front surface.

5. The locking box of claim 1, further comprising a resilient bumper disposed adjacent the front portion of the lid.

6. The locking box of claim 1, wherein the lid includes a main frame and right and left molded end caps attached to the frame.

7. The locking box of claim 1, wherein each locking mechanism is substantially completely enclosed in the lid.

8. The locking box of claim 3, wherein the locking mechanisms are connected to each other by a linkage mechanism for simultaneous operation.

9. The locking box of claim 1, wherein each actuating handle is pivotally secured to the lid for rotation to selectively engage and actuate the corresponding latching device.

10. The locking box of claim 1, further including a locking device attached to the lid for selectively preventing rotation of the actuating handle.

11. The locking box of claim 8, wherein the locking device includes a cylinder lock.

12. The locking box of claim 1, wherein each locking mechanism is operated by rotating the actuating handle.

13. The locking box of claim 1, wherein each latching device includes:
    a lock plate non-movably attached to the lid;
    a latch plate pivotally attached to the lock plate for selectively engaging the member on the front surface of the body; and
    a trip bracket pivotally mounted on the lock plate, which selectively allows pivotal movement of the latch plate.

14. The locking box of claim 13, wherein each latching device further includes a pivot arm fixed to and extending from the handle to actuate the trip bracket.

15. The locking box of claim 14, wherein the trip bracket is biased to a first position by an elastic member mounted in the latching device, and can be actuated by the pivot arm to move to a second position.

16. The locking box of claim 1, wherein the lid includes a front frame member, and the latching device is attached to aback wall of the front frame member and the actuating handle is attached to the front frame member and enclosed within an open channel formed in the front frame member.

17. A locking box comprising:
    a body defining an enclosable volume, said body including front, rear, and side surfaces;

a lid having a front portion and a rear portion, the rear portion being pivotally mounted to the body; and at least one locking mechanism disposed adjacent the front portion of the lid for securing the front portion of the lid to the body, each locking mechanism comprising:

an actuating handle pivotably mounted to the lid and disposed entirely within a channel in the lid;

a pivot arm non-rotatably connected to the actuating handle so that it pivots with the actuating handle; and a latching device operatively connected to the pivot arm and adapted to engage a member on the front surface of the body to securely hold the front portion of the lid to the body, the latching device having a latch plate that selectively engages the member, wherein the latch plate has a first position to engage the member and a second position to release the member so that the lid can be separated from the body.

18. The locking box of claim 17, wherein the member includes a protrusion and latch plate has a recess to accommodate the protrusion.

19. The locking box of claim 17, including two locking mechanisms.

20. The locking box of claim 17, wherein the latch plate is biased to the first position by an elastic member.

21. The locking box of claim 17, wherein the front portion of the lid overhangs the body beyond the front surface.

22. The locking box of claim 17, further comprising a resilient bumper disposed adjacent the front portion of the lid.

23. The locking box of claim 17, wherein the lid includes a main frame and right and left molded end caps attached to the frame.

24. The locking box of claim 17, wherein each locking mechanism is substantially completely enclosed in the lid.

25. The locking box of claim 19, wherein the locking mechanisms are connected to each other by a linkage mechanism for simultaneous operation.

26. The locking box of claim 25, wherein when one locking mechanism is actuated to the second position, the linkage mechanism substantially simultaneously actuates the other locking mechanism to the second position.

27. The locking box of claim 26, wherein the locking mechanisms and the linkage mechanism are substantially completely enclosed in the lid and hidden from view when viewing the locking box from the top or from the front.

28. The locking box of claim 17, wherein each actuating handle is pivotally secured to the lid for rotation to selectively engage and actuate the corresponding latching device.

29. The locking box of claim 17, further including a locking device attached to the lid for selectively preventing rotation of the actuating handle.

30. The locking box of claim 29, wherein the locking device includes a cylinder lock.

31. The locking box of claim 17, wherein each locking mechanism is operated by rotating the actuating handle.

32. The locking box of claim 17, wherein each latching device further includes:

a lock plate non-movably attached to the lid; and a trip bracket pivotally mounted on the lock plate, which selectively allows pivotal movement of the latch plate.

33. The locking box of claim 32, wherein each latching device further includes a pivot arm fixed to and extending from the handle to actuate the trip bracket.

34. The locking box of claim 33, wherein the trip bracket is biased to a first position by an elastic member, and can be actuated by the pivot arm to move to a second position.

* * * * *

UNITED STATES PATENT AND TRADEMARK OFFICE
CERTIFICATE OF CORRECTION

PATENT NO. : 6,151,933
DATED : November 28, 2000
INVENTOR(S) : Lentini

Page 1 of 1

It is certified that error appears in the above-identified patent and that said Letters Patent is hereby corrected as shown below:

Claim 16, column 10,
Line 62, change "aback" to -- a back --.

Signed and Sealed this

Second Day of October, 2001

Attest:

NICHOLAS P. GODICI
Attesting Officer
Acting Director of the United States Patent and Trademark Office